United States Patent
Bauer et al.

(10) Patent No.: US 10,000,418 B2
(45) Date of Patent: Jun. 19, 2018

(54) REFRACTORY PRODUCT, USE OF ZIRCONIUM DIOXIDE, ZIRCONIUM DIOXIDE, METHOD FOR MANUFACTURING A REFRACTORY PRODUCT AND A REFRACTORY PRODUCT MANUFACTURED THEREWITH

(71) Applicant: Refractory Intellectual Property GmbH & Co. KG, Vienna (AT)

(72) Inventors: Christoph Bauer, Graz (AT); Norbert Freiberger, Graz (AT)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 0 days. days.

(21) Appl. No.: 15/320,928

(22) PCT Filed: May 28, 2015

(86) PCT No.: PCT/EP2015/061791
§ 371 (c)(1),
(2) Date: Dec. 21, 2016

(87) PCT Pub. No.: WO2016/008632
PCT Pub. Date: Jan. 21, 2016

(65) Prior Publication Data
US 2017/0152188 A1    Jun. 1, 2017

(30) Foreign Application Priority Data

Jul. 14, 2014  (EP) .................................... 14176881

(51) Int. Cl.
C04B 35/482     (2006.01)
C04B 35/52      (2006.01)
(Continued)

(52) U.S. Cl.
CPC .......... *C04B 35/482* (2013.01); *B22D 11/059* (2013.01); *C04B 35/52* (2013.01);
(Continued)

(58) Field of Classification Search
CPC ...... C04B 35/52; C04B 35/522; C04B 35/482
See application file for complete search history.

(56) References Cited

U.S. PATENT DOCUMENTS

| | | | |
|---|---|---|---|
| 4,419,311 A * | 12/1983 | Claussen | ................. B32B 18/00 264/122 |
| 4,989,762 A * | 2/1991 | Ando | ..................... B22D 41/54 222/607 |

(Continued)

FOREIGN PATENT DOCUMENTS

| | | |
|---|---|---|
| DE | 102012101741 A1 | 9/2013 |
| EP | 0908425 A1 | 4/1999 |

(Continued)

*Primary Examiner* — Karl E Group
(74) *Attorney, Agent, or Firm* — Medley, Behrens & Lewis, LLC (57) ABSTRACT

The invention relates to a refractory product comprising zirconium dioxide, a use of zirconium dioxide, a zirconium dioxide, a method for manufacturing a refractory product and a refractory product manufactured by means of said method. The zirconium dioxide is in cubic form and is metastable at room temperature. The zirconium dioxide has a content of calcium, magnesium and yttrium of less than 1% by weight.

12 Claims, 4 Drawing Sheets

(51) Int. Cl.
*C04B 35/64* (2006.01)
*C04B 35/63* (2006.01)
*B22D 11/059* (2006.01)

(52) U.S. Cl.
CPC .......... *C04B 35/6303* (2013.01); *C04B 35/64* (2013.01); *C04B 2235/3206* (2013.01); *C04B 2235/3208* (2013.01); *C04B 2235/3227* (2013.01); *C04B 2235/3244* (2013.01); *C04B 2235/422* (2013.01); *C04B 2235/602* (2013.01); *C04B 2235/762* (2013.01); *C04B 2235/786* (2013.01); *C04B 2235/9676* (2013.01)

(56) References Cited

U.S. PATENT DOCUMENTS

| | | | | |
|---|---|---|---|---|
| 5,082,809 A * | 1/1992 | Hayashi | ............... | C04B 35/119 501/103 |
| 5,204,298 A * | 4/1993 | Yaoi | ............... | B22D 41/02 501/104 |
| 7,148,167 B2 * | 12/2006 | Shikata | ............... | C04B 35/119 501/104 |
| 7,396,789 B2 * | 7/2008 | Champion | ............... | C04B 35/12 501/103 |
| 9,630,883 B2 * | 4/2017 | Kuntz | ............... | C04B 35/6455 |
| 2009/0233081 A1 | 9/2009 | Morikawa et al. | | |
| 2012/0252655 A1 * | 10/2012 | Kuntz | ............... | A61L 27/047 501/135 |

FOREIGN PATENT DOCUMENTS

| | | | |
|---|---|---|---|
| JP | 59152266 | * | 8/1984 |
| JP | 2005289721 A | | 10/2005 |
| SU | 414234 | * | 5/1974 |
| WO | 2010127810 A1 | | 11/2010 |

* cited by examiner

REFRACTORY PRODUCT, USE OF ZIRCONIUM DIOXIDE, ZIRCONIUM DIOXIDE, METHOD FOR MANUFACTURING A REFRACTORY PRODUCT AND A REFRACTORY PRODUCT MANUFACTURED THEREWITH

The invention relates to a refractory product, a use of zirconium dioxide, a zirconium dioxide, a method for manufacturing a refractory product and a refractory product manufactured by means of said method.

For the purposes of the invention, the term "refractory product" particularly describes refractory products having a service temperature upwards of 600° C. and preferably refractory products according to DIN 51060, that is to say substances with a pyrometric cone equivalent>Seger Cone 17. The pyrometric cone equivalent may be calculated particularly in accordance with DIN EN 993-12.

Refractory products are typically based on one of the following oxides: $Al_2O_3$, MgO, $Cr_2O_3$, $SiO_2$, CaO or $ZrO_2$.

Because of its good resistance to corrosion, zirconium dioxide ($ZrO_2$) is used particularly in refractory products for which good corrosion resistance and wear resistance are imperative. To this extent, a preferred application area for refractory products containing $ZrO_2$ is continuous steel casting, for example in which refractory products containing $ZrO_2$ are used for instance as slide plates, monobloc stoppers, immersion pipes or submerged nozzles. In this context it is typically not the entire refractory product that is based on $ZrO_2$, but only those areas that must be constructed for particular resistance to corrosion and abrasion. In particular, such areas may be areas of the refractory products that must be positioned in the area of the slag during operation, or along which the molten steel has a relatively high flow speed.

In general, $ZrO_2$, has proven to be a corrosion-resistant material in such refractory products. However, when $ZrO_2$ is used in a refractory product, account must be taken of the known phenomenon according to which $ZrO_2$ can occur in any of three variants. Accordingly, at room temperature and up to a temperature of about 1,173° C., $ZrO_2$ in the pure form is in a monoclinic low-temperature phase, which is converted into the tetragonal or cubic high temperature phase above this temperature. Above a temperature of about 2,370° C., $ZrO_2$ only exists in the cubic variant. These phase conversions are reversible, although the reconversion to the monoclinic low temperature variant is shifted toward lower temperatures and does not occur until after about 920° C.

Since the monoclinic low temperature phase of the $ZrO_2$ has a roughly 5% greater volume than that of the tetragonal and cubic high temperature phase, the $ZrO_2$ contracts or expands by this amount every time the respective conversion temperature boundary between the monoclinic low temperature phase and the tetragonal or cubic high temperature phase is crossed in the corresponding direction. If the refractory product were to contain pure $ZrO_2$, this change in volume would result in the formation of cracks in the product.

In order to avoid this volume jump of the $ZrO_2$ when the temperature fall below the conversion temperature, it is known to stabilise the high temperature variant by adding certain oxides, so that the high temperature variant is retained in a metastable state at room temperature as well. Oxides that are known to lend corresponding stabilisation are for example MgO, CaO, $Y_2O_3$, or rare earth oxides. For example, the cubic variant may be preserved in a metastable state down to room temperature by an addition of at least 16 mole percent CaO, at least 16 mole percent MgO or at least 8 mole percent $Y_2O_3$ to the $ZrO_2$. $ZrO_2$ that has been fully stabilised in this way is referred to as fully stabilised $ZrO_2$ (FSZ, "Fully Stabilized Zirconia"). If $ZrO_2$ is stabilised by the addition of stabilising oxides only in such percentages that the cubic variant is only partially retained in the metastable state as low as room temperature, the $ZrO_2$ in this form is referred to as partly stabilised $ZrO_2$ (PSZ, "Partly Stabilized Zirconia").

Fully stabilised $ZrO_2$ exhibits linear thermal expansion, while partly stabilised $ZrO_2$ only has a more or less pronounced volume jump as a function of the dependency of remaining percentages of monoclinic $ZrO_2$ when the conversion temperature boundary is crossed in either direction. Correspondingly fully or partly stabilised $ZrO_2$ is therefore suitable for use as a material in refractory products.

Fully and partly stabilised zirconia share one disadvantage compared with pure $ZrO_2$ however, specifically that the corrosion resistance and chemical resistance of fully or partly stabilised $ZrO_2$ are both reduced compared with pure $ZrO_2$. This is due in particular to the fact that the stabilising additives combine with substances with which the refractory product comes into contact during operation to form phases having low melting points, which phases are then released from the product. Such substances may be, in particular, components of the molten steel or slag, which form phases with stabilising additives in the form of CaO, MgO or $Y_2O_3$.

To this extent, the excellent corrosion resistance of $ZrO_2$ is compromised by stabilising additives.

The object underlying the invention is to provide a refractory product that contains $ZrO_2$, particularly a refractory ceramic product, in which that $ZrO_2$ exhibits little or no abnormally pronounced thermal expansion when the conversion temperature boundary between the low temperature phase and the high temperature phase is crossed in either direction, but at the same time has improved corrosion resistance compared with the fully or partly stabilised $ZrO_2$ known from the prior art.

A further object of the invention is to provide a method for manufacturing such a refractory product and a refractory product manufactured in accordance with such a method.

In order to achieve the first object, a refractory product is provided according to the invention, which product comprises a mineral phase in the form of zirconium dioxide in a cubic variant that is stable at room temperature and having a component of calcium, magnesium and yttrium equal to less than 1% by weight.

The total mass of the elements calcium, magnesium and yttrium in the zirconium dioxide of the invention is this less than 1% by weight relative to the total mass of the zirconium dioxide.

According to the invention, it was found that zirconium dioxide which in the cubic variant forms a mineral phase that is stable at room temperature and having a calcium, magnesium and yttrium content not exceeding 1% by weight (hereinafter also called "zirconium dioxide according to the invention") constitutes an excellent $ZrO_2$-based raw material for refractory products, particularly refractory ceramic products, because such a zirconium dioxide exhibits very little or no anomalous thermal expansion and at the same time better resistance to corrosion than is achieved with the partly or fully stabilised $ZrO_2$ known from the prior art.

The absence or only very minor occurrence of anomalous thermal expansion of the zirconium dioxide in cubic variant which is stable at room temperature is caused by the fact that the substance always exists in the cubic variant in the temperature range between room temperature and 2,370° C., and the variants therefore to not undergo any conversion. The better resistance to corrosion of the zirconium dioxide according to the invention compared with the partly or fully stabilised $ZrO_2$ known from the prior art is explained by the fact that the content of calcium, magnesium and yttrium content in the zirconium dioxide in cubic variant which is stable at room temperature is limited to quantities of less than 1% by weight.

In order to improve the corrosion resistance of the zirconium dioxide according to the invention still further, it may be provided according to the invention that the calcium, magnesium and yttrium content in the zirconium dioxide according to the invention is also limited to less than 0.9% by weight, 0.8% by weight, 0.7% by weight, 0.6% by weight, 0.5% by weight, or less than 0.4% by weight, relative in each case to the total mass of the zirconium dioxide according to the invention. However, it is scarcely possible to provide the zirconium dioxide according to the invention in chemically pure form, such that the calcium, magnesium and yttrium may be present in the zirconium dioxide according to the invention in quantities of at least 0.1% by weight, 0.2% by weight or 0.3% by weight, relative in each case to the total mass of the zirconium dioxide according to the invention.

According to a development of the inventive idea, it may be provided that the quantity of extraneous oxides in the zirconium dioxide according to the invention is less than 1.5% by weight. In this respect, the term "extraneous oxides" is used to refer to all oxides that are not $ZrO_2$ or $HfO_2$ (since it is known that natural zirconium raw materials always contain small quantities of $HfO_2$), also including the stabilising additives in the form of CaO, MgO, $Y_2O_3$, and rare earth oxides known from the prior art.

It has been found according to the invention that the corrosion resistance of the zirconium dioxide according to the invention may be improved still further, if it is provided according to the invention that the content of rare earth oxides in the zirconium dioxide according to the invention is less than 1.5% by weight, that is to say for example limited to less than 1.4% by weight, 1.3% by weight, 1.2% by weight, 1.1% by weight, 1.0% by weight, 0.9% by weight, 0.8% by weight, 0.7% by weight, or less than 0.6% by weight, relative in each case to the total mass of the zirconium dioxide according to the invention. For the reasons given above, the content of extraneous oxides may also constitute for example at least 0.1% by weight, 0.2% by weight or at least 0.3% by weight, relative in each case to the total mass of the zirconium dioxide according to the invention.

The zirconium dioxide according to the invention may particularly be present in the form of monocrystallites. To this extent, the zirconium dioxide according to the invention may also be present in particular in the form of grains of zirconium dioxide containing the monocrystallites in the form of the zirconium dioxide according to the invention.

If grains of zirconium dioxide contain zirconium dioxide according to the invention as well as zirconium dioxide that is not according to the invention, it may preferably be provided according to the invention that such grains of zirconium dioxide contain zirconium dioxide according to the invention in a proportion of at least 50% by weight relative to the total weight of the grains of zirconium dioxide, i.e. for example also at least 60% by weight, 70% by weight, 80% by weight, 90% by weight, or also at least 95% by weight.

It may also preferably be provided according to the invention that, if the refractory product according to the invention contains zirconium dioxide not according to the invention as well as zirconium dioxide according to the invention, said product contains zirconium dioxide according to the invention in an amount of at least 50% by weight relative to the total mass of the zirconium dioxide in the product, for example also at least 60% by weight, 70% by weight, 80% by weight, 90% by weight or even 95% by weight. The zirconium dioxide may preferably be present in the products according to the invention in the form of grains of zirconium dioxide, which may particularly be composed as described in the preceding.

It was found according to the invention that the zirconium dioxide according to the invention or a product according to the invention that contains zirconium dioxide according to the invention each have particularly good refractory properties, in particular excellent resistance to corrosion, if the zirconium dioxide according to the invention forms monocrystallites having a size in the range from 30 to 1,000 µm, particularly in the range from 40 to 1,000 µm, from 50 to 1,000 µm, or in the range from 60 to 1,000 µm.

Therefore, it may be provided for example that grains of zirconium dioxide include at least 50% by weight of zirconium dioxide according to the invention in the form of monocrystallites having a size in the range from 30 to 1,000 µm, in the range from 40 to 1,000 µm, in the range from 50 to 1,000 µm, or in the range from 60 to 1,000 µm, that is to say for example also 60, 70, 80, 90 or 95% by weight, relative in each case to the total weight of the zirconium dioxide grain.

According to the invention, the term "zirconium dioxide" is used to refer to the oxide zirconium(IV)oxide, that is to say $ZrO_2$.

In this document, the term "zirconium dioxide not according to the invention" is understood particularly to mean zirconium dioxide that does not have the features of the zirconium dioxide according to the invention disclosed in this document.

The refractory product according to the invention may particularly be a shaped product, more particularly a wearing part, particularly preferably a wearing part for continuous steel casting. In such a product or wearing part, the zirconium dioxide according to the invention may particularly be present in the areas in which the product comes into contact with the slag or at which the product is in contact with the fast flowing molten steel, for example in the immersion area of the tundish pipe, at the flowthrough of a slide plate, at the stopper lug and in the inflow and submersion area of the submerged nozzle. In this context, the product according to the invention may be a tundish pipe, a slide plate, a monobloc plug, a nozzle or a submerged nozzle.

The refractory product according to the invention may particularly be a product that has been shaped by isostatic pressing.

In the product according to the invention, the zirconium dioxide according to the invention may be present in a carbon matrix, for example. The carbon matrix may be present particularly in the form of graphite.

Generally, however, the product according to the invention may be any refractory product, for example also a refractory ceramic product, that is to say a sintered refractory product in the form of grains that have been sintered together. In this respect, the zirconium dioxide according to the invention may be present in the product according to the invention in the form of sintered grains, for example.

Partly or fully stabilised zirconium dioxide known from the prior art may initially serve as the starting point for manufacturing the zirconium dioxide according to the invention. The zirconium dioxide according to the invention may thereafter be obtained by firing such a zirconium dioxide that has been partly or fully stabilised with stabilising additives in a reducing atmosphere and in the presence of a gas-phase reagent for the stabilising additives, followed by cooling.

The zirconium dioxide that has been partly or fully stabilised with stabilising additives and which serves as the basis for firing may particularly be stabilised by stabilising additives in the form of at least one of the following substances: CaO, MgO, $Y_2O_3$ or rare earth oxides.

Otherwise, the zirconium dioxide that has been partly or fully stabilised may be a zirconium dioxide that has been partly or fully stabilised according to the prior art.

In order to manufacture the zirconium dioxide according to the invention, this is now fired in a reducing atmosphere and in the presence of a gas-phase reagent for the stabilising additives. The reducing atmosphere may preferably have a partial oxygen pressure below $10^{-6}$ Pa, for example also a partial oxygen pressure below $10^{-7}$ or $10^{-8}$ Pa. As is known from the prior art, the reducing atmosphere may be generated for example by firing the partly or fully stabilised zirconium dioxide in the presence of carbon, in the form of graphite, coke or coal, for example, preferably in a closed furnace chamber. For this purpose, the partly or fully stabilised zirconium dioxide may be placed on a bed made from such a carbon carrier, for example, or mixed with such a carbon carrier.

A significant step in this method for manufacturing the zirconium dioxide in cubic variant that is stable at room temperature with a quantity of extraneous oxides within the scope of the invention now consists in that the reduction firing of the fully or partly stabilised zirconium dioxide takes place in the simultaneous presence of a gas-phase reagent for the stabilising additives. Because this gas-phase reagent forms compounds with the stabilising additives of the zirconium dioxide during the reduction firing of the zirconium dioxide, with the result that at least some, and preferably most of the stabilising additives, are removed from the zirconium dioxide. After the zirconium dioxide has cooled, the percentage of stabilising additives still in the zirconium dioxide is thus reduced compared to the percentage of stabilising additives in the zirconium dioxide before firing to such a degree that the corrosion resistance of the zirconium dioxide is substantially increased compared to its corrosion resistance before firing. At the same time, the cubic high temperature variant of the zirconium dioxide is also maintained in a metastable state at room temperature despite the at least partial removal of the stabilising additives. Overall, through this manufacturing process and in accordance therewith, the zirconium dioxide according to the invention is obtained which forms a mineral phase in the cubic variant that is metastable at room temperature despite the low content of stabilising additives.

The gas-phase reagent that reacts with the stabilising additives during reduction firing of the zirconium dioxide may generally be any substance or mixture of substances that is present in the gas-phase in the furnace atmosphere during firing, and which reacts with at least one, but preferably all of the stabilising additives.

According to a particularly advantageous embodiment, a gas containing silicon and/or aluminium serves as a gas-phase reagent. In order to make such a gas containing silicon and/or aluminium available during reduction firing of the zirconium dioxide, metallic silicon and/or aluminium may be introduced into the furnace chamber besides the zirconium dioxide and the carbon carrier to form the silicon and/or aluminium containing gas during reduction firing. During the firing, the silicon in the silicon containing gas or the aluminium in the aluminium containing gas reacts particularly with stabilising additives in the form of calcium oxide, magnesium oxide or yttrium oxide, so that at least some of these stabilising additives are removed from the zirconium dioxide.

Alternatively or additionally, a gas-phase reagent may be present as carbon monoxide, which may be formed from the carbon carrier during firing. In this context, a gas-phase reagent may be present in the form of at least one of the gas-phase substances silicon, aluminium or carbon monoxide, for example.

Reduction firing is preferably conducted at temperatures in a range in which at least some of the zirconium dioxide is converted to the cubic variant thereof, that is to say preferably at temperatures above 1,173° C. It may also be provided that the reduction firing is conducted at temperatures above 2,370° C., so that all of the zirconium dioxide is converted to the cubic variant thereof. In the latter case, most if not all of the zirconium dioxide may exist in a cubic variant that is (meta)stable at room temperature after is has cooled down. Firing is conducted at temperatures below the melting temperature of zirconium dioxide, that is to say below 2,690° C.

The quantity of the stabilising additives that react with the gas-phase reagent during the reduction firing depends in particular on the duration of the firing. Accordingly, the proportion of stabilising additives that take part in a reaction with the gas-phase reagent during reduction firing increases with the length of the firing, until an equilibrium is established at a certain temperature. It was found according to the invention that a firing time in the order of about 12 hours is sufficient for enough of the stabilising additives to react with the gas-phase reagent so that the zirconium dioxide has a content of calcium, magnesium and yttrium lower than 1% by weight, so that the zirconium dioxide according to the invention with excellent corrosion resistance is obtained. It has been found according to the invention that most of the inventive zirconium dioxide prepared using such a method mainly forms crystallites having an average size of less than 30 μm. As was noted in the preceding text, however, such crystallites of the inventive zirconium dioxide have particularly advantageous properties when they exist in sizes greater than 30 μm, particularly greater than 40 μm, 50 μm, or greater than 60 μm. For this reason, according to the invention it may be provided that the inventive zirconium dioxide prepared using the method described in the preceding is exposed to a further thermal load, during which the crystallites grow together to form larger crystallites or monocrystals. According to the invention, it may preferably be provided that the inventive zirconium dioxide prepared using the preceding method is exposed to a thermal load at temperatures above 900° C., particularly in a temperature range of 900 to 1,500° C., for example, so that the crystallites of zirconium dioxide grow together to form larger crystallites or monocrystals having a size in the range from 30 to 1,000 μm, particularly in the range from 40 μm to 1,000 μm, from 50 μm to 1,000 μm, or in the range from 60 μm to 1,000 μm.

A further object of the invention is the inventive zirconium dioxide described herein, in the form of a mineral phase in the cubic variant that is metastable at room temperature and contains a quantity of less than 1% by weight calcium, magnesium and yttrium.

A further object of the invention is the use of a zirconium dioxide in the form of a mineral phase in the cubic variant that is metastable at room temperature and contains a quantity of less than 1% by weight calcium, magnesium and yttrium as the starter material for manufacturing refractory products.

The zirconium dioxide used may have the features described herein, and the use may be carried out as described herein.

A further object of the invention is a method for preparing a zirconium dioxide in the cubic variant that is metastable at room temperature and contains a quantity of less than 1% by weight calcium, magnesium and yttrium as described herein.

A further object of the invention is a method for manufacturing a refractory product comprising the following steps:
  Providing a mineral phase that is metastable at room temperature in the form of zirconium dioxide in the cubic variant containing a quantity of less than 1% by weight calcium, magnesium and yttrium;
  Combining the mineral phase that is metastable at room temperature in the form of zirconium dioxide in the cubic variant having a quantity of less than 1% by weight calcium, magnesium and yttrium with one or more additional refractory raw materials;
  pressing a moulded body made from the zirconium dioxide and the additional refractory raw materials;
  firing the moulded body to produce a refractory product.

Thus, in the method according to the invention a refractory raw material is provided that corresponds to or comprises the zirconium dioxide according to the invention. This raw material may be used on its own or it may be combined with one or more additional refractory starter materials, for example with refractory raw materials based on at least of the following substances: $Al_2O_3$, MgO, $SiO_2$, $Cr_2O_3$ or carbon.

The starter materials are then pressed to form a moulded body, that is to say a green body, particularly by isostatic pressing, for example.

The green body may then undergo firing, after which a refractory product is obtained after cooling.

As was noted previously, a refractory product according to the invention, also particularly a product such as is manufactured in the method according to the invention, preferably comprises grains or monocrystals of the zirconium dioxide according to the invention with a size in the range from 30 to 1,000 μm. If the moulded body pressed according to the inventive method comprises mainly zirconium dioxide according to the invention consisting of grains or monocrystals that are smaller than this before firing, it may be provided according to the invention to carry out a method step to increase the size of the crystallites of the zirconium dioxide according to the invention. As described previously, this method step may consist of subjecting the pressed moulded body to a thermal load under which the crystal size of the crystallites or monocrystals of the inventive zirconium dioxide increases. In particular, the thermal load may be applied at such a temperature and for such a period that the zirconium dioxide grows to form crystallites having a size mainly in the range from 30 to 1,000 μm. The thermal load may be applied for example at a temperature in the range from 900 to 1,500° C. and for a duration of about 72 hours, for example.

This method step of thermal loading to induce crystal growth may be carried out for example between the pressing and the firing of the moulded body. This may be the case for example if a refractory ceramic product is produced, that is to say a refractory product with a ceramic binder, in which the ceramic firing is carried out at a temperature above to 1,500° C. for sintering of the grains.

Alternatively, this method step of thermal loading may be carried out at the same time as the moulded body is fired to manufacture a refractory product. This may be the case for example if a refractory product is manufactured with a carbon bond, in which the firing is carried out in the stated temperature range to coke the carbon and create a carbon bonder matrix.

A further object of the invention is a refractory product that has been manufactured using a method according to the invention.

Further features of the invention are described in the claims, the accompanying figures and the associated notes, as well as the exemplary embodiment.

All of the features of the invention disclosed herein may be combined with each other in any permutation thereof.

An embodiment of the method according to the invention and of a refractory product according to the invention that was manufactured using the method represented in the embodiment will be described in greater detail in the following.

The method described in the embodiment is used to manufacture a refractory product in the form of a submerged nozzle for a tundish in continuous steel casting.

In order to manufacture the submerged nozzle, a starter material is first provided in the form of a mineral phase that is stable at room temperature in the form of zirconium dioxide in the cubic variant having a calcium content of about 0.4% by weight. In order to manufacture such a starter material, zirconium dioxide that has been partly stabilised with about 4-5% by weight calcium oxide (corresponding to calcium content of about 2.8-3.6% by weight) is first fired in a reducing atmosphere in the presence of a gas containing silicon and aluminium, and is then cooled. In specific terms, this partly stabilised zirconium dioxide is mixed as a granulate with granulated carbon and granular metallic silicon and aluminium, and then fired in a closed furnace chamber for about 8 hours at a temperature of about 1,500° C. In this process, the granulated carbon creates a reducing atmosphere, so that the partial oxygen pressure in the furnace chamber is about $10^{-7}$ Pa. At the same time, a gas rich in silicon and aluminium is formed from the granular silicon and aluminium during the firing, and this gas reacts with quantities of the calcium oxide in the partly stabilised zirconium dioxide. The percentage of calcium oxide in the partly stabilised zirconium dioxide is thus reduced during the firing to an average percentage less than 0.5% by weight. The calcium oxide contained in the cubic zirconium dioxide is removed by the firing; however, the cubic zirconium dioxide remains in a metastable state even after most of the calcium oxide has been removed (see FIG. 3). After firing, the correspondingly formed zirconium dioxide forms crystallites, most of which are smaller than 30 μm, (see microsections in FIGS. 1 and 2). The correspondingly formed zirconium dioxide is then mixed with a refractory raw material in the form of graphite with the addition of an organic binder. This mixture is further combined with a refractory raw material in the form of alumina graphite ($Al_2O_3$—C) and moulded by isostatic pressing to produce a moulded body in the shape of an unfired submerged nozzle. In this process, the mixture of zirconium dioxide and graphite forms a partial coating of the submerged nozzle in those areas that come into contact with the molten steel during operation.

The correspondingly formed moulded body is then fired at a temperature in the range from 900 to 1,000° C., so that the binder is coked and forms a carbon bond or a carbon matrix in each case. At the same time, the thermal load is applied in this temperature range for a period long enough to ensure that the zirconium dioxide grows into crystallites with a size mainly in a range between 50 and 1,000 µm. After cooling, a refractory product in the shape of a submerged nozzle is obtained.

Figure 1:
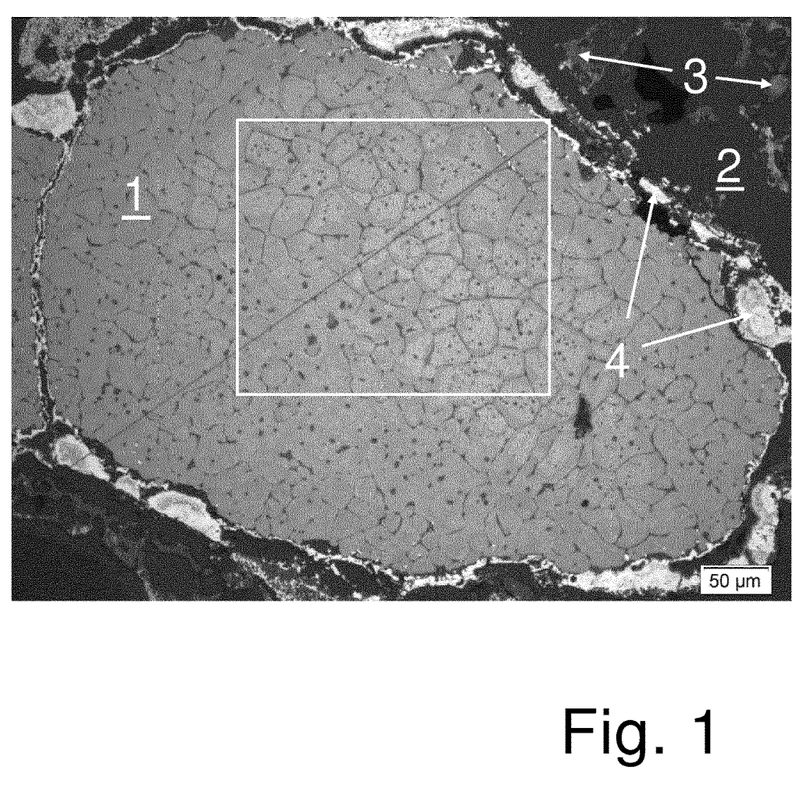
FIG. 1 a view of a cross section of a grain of zirconium dioxide that comprises the zirconium dioxide according to the embodiment, FIG. 2 an enlarged view of the view of FIG. 1, FIG. 3 the result of an X-ray diffractometry measurement of the zirconium dioxide according to the embodiment, and FIG. 4 a view of a cross section of a grain of zirconium dioxide that comprises the zirconium dioxide manufactured according to the invention, but in a variation of the embodiment thereof.
Figure 2:
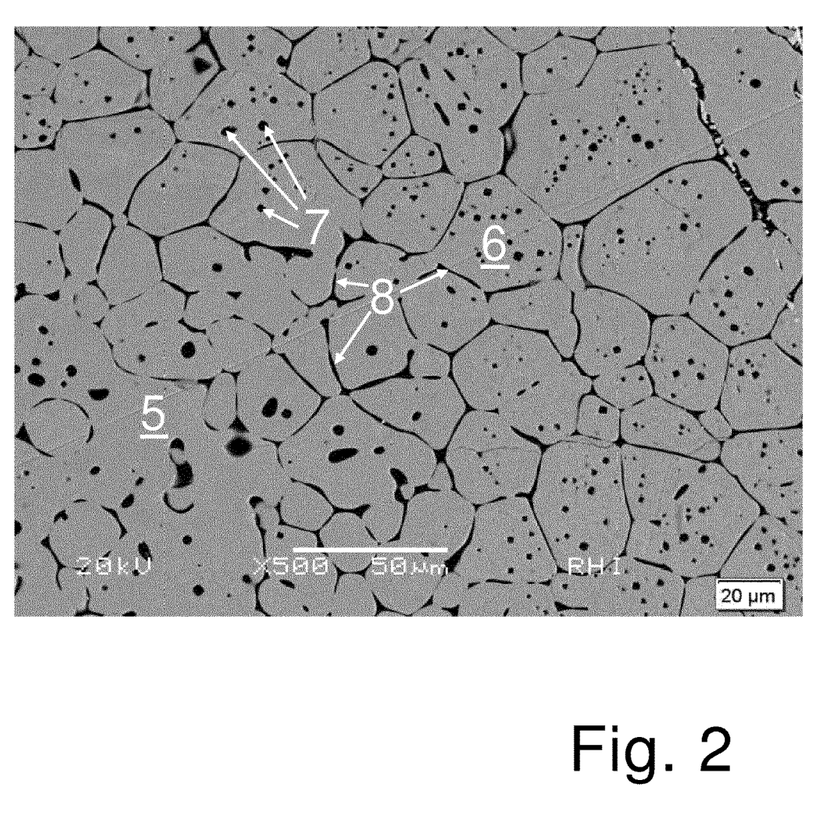

The accompanying FIGS. 1 and 2 show microsections of the zirconium dioxide that is created according to the embodiment after the first firing, described above, at 1,500° C. and before further processing and the second firing at 900 to 1,000° C.

FIG. 1 shows a partial view of a cross section of a grain of zirconium dioxide 1 that consists almost entirely of zirconium dioxide according to the invention, and was obtained using the method of the embodiment. The partial view is of an area of about 600×450 µm. The black bar at bottom right of the image represents a length of 100 µm. As described in the embodiment, grain 1 is still embedded in its surrounding 2 of carbon granulate with granular silicon and aluminium, the dark areas in FIG. 1. Dark grey inclusions 3 in the dark surrounding 2 are inclusions of silicon carbide that have been formed from silicon and the carbon in the carbon granulate during firing. The irregular, lighter areas 4 that surround grain 1 like an atoll consist mainly of zirconium carbonitride, which has formed from the zirconium of the zirconium dioxide, the carbon in the carbon granulate and atmospheric oxygen during firing.

Grain 1 comprises a large number of zirconium dioxide monocrystallites. The boundaries between the monocrystallites appear as thin, black, reticular areas within the grain 1. The section framed in white within grain 1 is shown in an enlarged view in FIG. 2.

The many monocrystallites are shown clearly in the enlarged view of grain 1 according to FIG. 2. The white bar at centre bottom of the image represents a length of 50 µm. Two of the monocrystallites, identified in FIG. 2 by the reference numerals 5 and 6, were examined more closely with regard to their elemental composition. Grain 1 was also examined by x-ray diffractometry to determine its crystallographic composition.

The examination of monocrystallites 5 and 6 revealed the following elemental composition, in % by weight of each of the elements in question relative to the respective monocrystal:

| Mono-crystal no. | Zr | O | Hf | Ca | Mg | Y | Al | Si | N | C |
|---|---|---|---|---|---|---|---|---|---|---|
| 5 | 73.6 | 24.32 | 1.56 | 0.0 | 0.0 | 0.0 | 0.0 | 0.0 | 0.0 | 0.52 |
| 6 | 72.4 | 20.9 | 1.4 | 0.66 | 0.0 | 0.0 | 0.0 | 0.0 | 4.24 | 0.4 |

The black "islands" 7 inside the monocrystallites and the thin, black reticular areas 8 surrounding each of the monocrystallites were also examined more closely with respect to the elemental composition thereof. It was found that, unlike the monocrystallites, these areas 7, 8 contained high concentrations of calcium, aluminium and silicon, and higher concentrations of oxygen and lower concentrations of zirconium than the monocrystallites. It may therefore be assumed that the calcium oxide which is initially present in the zirconium dioxide for stabilising purposes has become concentrated in these islands 7 inside the zirconium dioxide crystals and in the areas 8 outside the zirconium dioxide crystals as a result of diffusion processes. It may further be assumed that the metallic aluminium and silicon have been oxidised during the firing, and have also become concentrated in said islands 7 and areas 8 due to diffusion processes.

Figure 3:
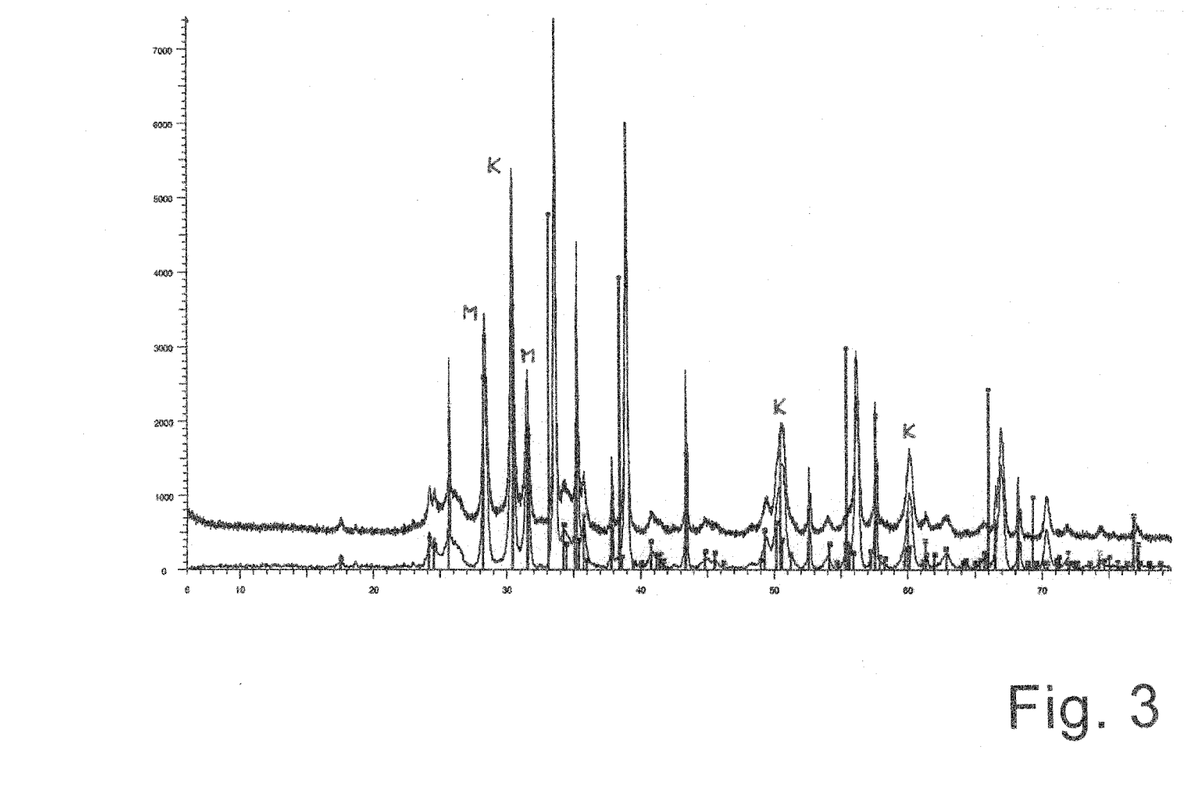

The x-ray diffractometric examination of the zirconium dioxide manufactured according to the embodiment, as shown in FIG. 3, confirms that most of the zirconium dioxide manufactured according to the embodiment is in the cubic variant and only very little is in the monoclinic form. The main peaks of the cubic zirconium dioxide are designated with a K, and the main peaks of the monoclinic zirconium dioxide are designated with an M.

Figure 4:
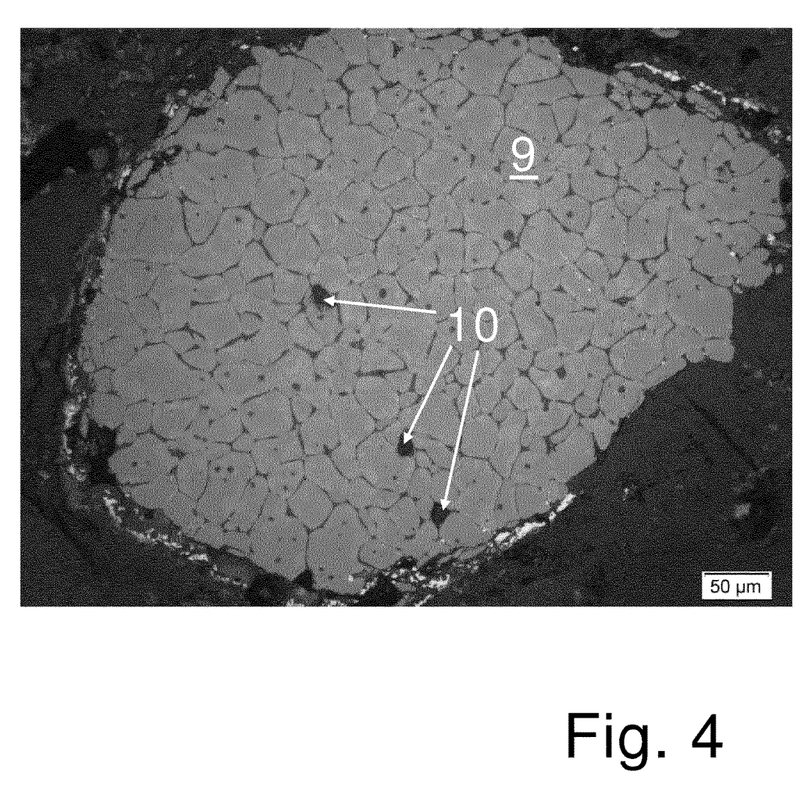

FIG. 4 shows a part view of a cross section of a grain 9 of zirconium dioxide that was manufactured essentially according to the embodiment, but with the difference that it was not fired for about 8 hours at a temperature of about 1,500° C. but for about 24 hours at a temperature of about 1,300° C. instead. This shows clearly that the islands 10 in the zirconium dioxide crystallites, which contain greater concentrations of calcium oxide among other characteristics, are larger and fewer in number than in the zirconium dioxide of FIGS. 1 and 2. This is attributable to the longer firing period, since this meant that more time was available for diffusion of the calcium dioxide.

The invention claimed is:

1. A refractory product comprising a mineral phase in the form of zirconium dioxide in the cubic variant thereof that is metastable at room temperature, having a content of calcium, magnesium and yttrium less than 1% by weight, wherein the zirconium dioxide comprises monocrystallites with a grain size in the range from 30 to 1,000 µm and wherein the quantity of oxides in the zirconium dioxide other than $ZrO_2$ or $HfO_2$ is less than 1.5% by weight.

2. The product according to claim 1, in the shape of a wearing part for continuous steel casting.

3. The product according to claim 1, in the shape of a slide plate, a monobloc stopper, a nozzle, an immersion pipe or a submerged nozzle.

4. The product according to claim 1, in which the zirconium dioxide is present in a carbon matrix.

5. The product according to claim 1, in which the zirconium dioxide was obtained by firing zirconium dioxide that was partly or fully stabilised with stabilising additives in a reducing atmosphere and in the presence of a gas-phase reagent for the stabilising additives, followed by cooling.

6. The product according to claim 5, with stabilising additives in the form of at least one of the following substances: calcium oxide, magnesium oxide, yttrium oxide, or rare earth oxides.

7. The product according to claim 5, in which the reducing atmosphere has a partial oxygen pressure below 10-6 Pa.

8. The product according to claim 5, with a gas-phase reagent in the form of at least one of the following gas-phase substances: silicon, aluminium or carbon monoxide.

9. The product according to claim 5, in which the firing is carried out at temperatures in the range from 1,173 to 2,690° C.

10. A zirconium dioxide in the form of a mineral phase that is metastable in the cubic variant thereof at room temperature, with a content of less than 1% by weight calcium, magnesium and yttrium, wherein the zirconium dioxide comprises monocrystallites with a grain size in the range from 30 to 1,000 μm and wherein the quantity of oxides in the zirconium dioxide other than $ZrO_2$ or $HfO_2$ is less than 1.5% by weight.

11. A method for manufacturing a refractory product comprising the following steps:
  providing a mineral phase that is metastable at room temperature in the form of zirconium dioxide in the cubic variant containing a quantity of less than 1% by weight calcium, magnesium and yttrium, wherein the zirconium dioxide comprises monocrystallites with a grain size in the range from 30 to 1,000 μm and wherein the quantity of oxides in the zirconium dioxide other than $ZrO_2$ or $HfO_2$ is less than 1.5% by weight;
  combining the zirconium dioxide with additional refractory raw materials;
  pressing a moulded body made from the zirconium dioxide and the additional refractory raw materials;
  firing the moulded body to produce a refractory product.

12. A refractory product manufactured using a method, the method comprising:
  providing a mineral phase that is metastable at room temperature in the form of zirconium dioxide in the cubic variant containing a quantity of less than 1% by weight calcium, magnesium and yttrium, wherein the zirconium dioxide comprises monocrystallites with a grain size in the range from 30 to 1,000 μm and wherein the quantity of oxides in the zirconium dioxide other than $ZrO_2$ or $HfO_2$ is less than 1.5% by weight;
  combining the zirconium dioxide with additional refractory raw materials;
  pressing a moulded body made from the zirconium dioxide and the additional refractory raw materials; and
  firing the moulded body to produce a refractory product.

* * * * *